United States Patent
Chen et al.

(10) Patent No.: US 9,259,840 B1
(45) Date of Patent: Feb. 16, 2016

(54) DEVICE AND METHOD TO LOCALIZE AND CONTROL A TOOL TIP WITH A ROBOT ARM

(71) Applicant: HRL Laboratories, LLC, Malibu, CA (US)

(72) Inventors: Zhichao Chen, Woodland Hills, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 133 days.

(21) Appl. No.: 14/208,655

(22) Filed: Mar. 13, 2014

Related U.S. Application Data

(60) Provisional application No. 61/779,120, filed on Mar. 13, 2013.

(51) Int. Cl.
| | |
|---|---|
| G05B 15/00 | (2006.01) |
| G05B 19/00 | (2006.01) |
| B25J 9/16 | (2006.01) |
| B25J 19/02 | (2006.01) |

(52) U.S. Cl.
CPC ............. *B25J 9/1697* (2013.01); *B25J 19/023* (2013.01); *G05B 2219/39008* (2013.01); *G05B 2219/40053* (2013.01); *Y10S 901/47* (2013.01)

(58) Field of Classification Search
CPC ........ B25J 9/1697; B25J 19/023; B25J 19/03; Y10S 901/01; Y10S 901/47; G05B 2219/40053; G05B 2219/39008; G06T 7/2033
See application file for complete search history.

(56) References Cited

U.S. PATENT DOCUMENTS

| | | | | |
|---|---|---|---|---|
| 6,297,844 | B1 * | 10/2001 | Schatz | G06K 9/00771 348/152 |
| 7,995,096 | B1 * | 8/2011 | Cressy | G08B 13/19691 348/143 |
| 8,380,349 | B1 * | 2/2013 | Hickman | G05D 1/0246 700/247 |
| 9,002,098 | B1 * | 4/2015 | Chelian | G06T 7/0044 382/153 |
| 2005/0286767 | A1 * | 12/2005 | Hager | G06K 9/00208 382/190 |
| 2011/0080464 | A1 * | 4/2011 | Alessandrini | G06T 5/005 348/42 |
| 2013/0217996 | A1 * | 8/2013 | Finkelstein | A61B 5/1075 600/407 |
| 2013/0335535 | A1 * | 12/2013 | Kane | G01B 11/2513 348/50 |

OTHER PUBLICATIONS

T. F. Chan and L. A. Vese. Active contours without edges. IEEE Transactions on Image Processing, 10(2): 266-277, Feb. 2001.

(Continued)

*Primary Examiner* — Jason Holloway
*Assistant Examiner* — Rachid Bendidi
(74) *Attorney, Agent, or Firm* — Tope-McKay & Associates

(57) ABSTRACT

Described is a system for localizing and controlling a tool tip with a robotic arm. The system receives three-dimensional (3D) visual information of a scene having a tool with a tool tip proximate a target. A depth disparity map is generated based on the 3D visual information. The depth disparity map is filtered by depth continuity to generate boundaries of the tool. The boundaries of the tool are initially loose to ensure that the tool is contained within the boundaries. Thereafter, using level set segmentation, the boundaries of the tool are shrunk and extracted. Ends of the tool tip are identified based on the extracted boundaries, which are then used to generate a pose of the tool tip.

18 Claims, 6 Drawing Sheets

(56) References Cited

OTHER PUBLICATIONS

Science. Jul. 30, 2010;329(5991):508-9. Making smarter, savvier robots. Kean S.

The Gulf Spill's Lessons for Robotics. Bleicher IEEE Spectrum News. Aug. 2010.

K. Kragic and H. I. Christensen. Integration of visual cues for active tracking of an end-effector, Proceedings of the IEEE/RSJ International Conference on Intelligent Robots and Systems, 1999.

C. Harris and M. Stephen, A combined corner and edge detector, Proceedings of the 4th Alvey Vision Conference, 1986.

C. Tomasi and T. Kanade, Detection and Tracking of Point Features, Carnegie Mellon University Technical Report CMU-CS-91-132, 1991.

D. Lowe. Distinctive Image Features from Scale-Invariant Keypoints, International Journal of Computer Vision, 60 (2): 91, 2004.

F. Hoffmann; T. Nierobisch, T. Seyffarth and G. Rudolph. Visual servoing with moments of SIFT features, IEEE International Conference on Systems, Man, and Cybernetics, 2006.

C. C. Kemp and A. Edsinge. Robot manipulation of human tools: Autonomous detection and control of task relevant features. 5th IEEE International Conference on Development and Learning, 2006.

T. Drummond and R. Cipolla. Real-time tracking of complex structures with on—line camera calibration, Proceedings of the British Machine Vision Conference, BMVC, vol. 2, Nottingham, pp. 574-583, 1999.

P. Chockalingam, N. Pradeep and S. Birchfield. Adaptive fragments-based tracking of non-rigid objects using level Sets, Proceedings of the IEEE Conference on International Conference on Computer Vision (ICCV). Kyoto, Japan, Sep. 2009.

* cited by examiner

DEVICE AND METHOD TO LOCALIZE AND CONTROL A TOOL TIP WITH A ROBOT ARM

CROSS-REFERENCE TO RELATED APPLICATIONS

This is a non-provisional patent application of U.S. Provisional Application No. 61/779,120, filed on Mar. 3, 2013, and entitled, "Device and Method to Localize and Control a Tool Tip with a Robot Arm."

GOVERNMENT RIGHTS

This invention was made with government support under U.S. Government Contract Number W91CRB-10-C-0126. The government has certain rights in the invention.

FIELD OF INVENTION

The present invention relates to robotic control systems and, more particularly, to a device and method to control a tool tip with a robot arm.

BACKGROUND OF INVENTION

Visually locating a tool tip on a robot is essential for vision-based robot control, which uses feedback from vision sensors to control the motion of a robot. The visual feedback reduces the reliance on precise calibration of the camera lens system as well as the entire robot system. To improve the positioning accuracy and stability, real world robot applications demand highly reliable algorithms for localizing robot end-effectors in unconstructed and dynamic environments.

Most researchers use template matching (using an image template) to locate the end-effector. The image template describes color, texture, and gradient-based edges. A region providing the maximal similarity measure is selected as the location of the object in the image. This kind of modeling includes assumptions about ambient lighting and background color that are not object features and, therefore, demonstrates a lack of robustness that is primarily due to lighting and background variation (see, for example, the List of Cited Literature References, Literature Reference No. 4). Other researchers apply feature-based methods, such as Harris corner features (see Literature Reference No. 5), KLT features (see Literature Reference No. 6) and SIFT features (see Literature Reference No. 7). Significant work has also been reported in object detection and recognition (see Literature Reference No. 8). Such methods usually require that the object has a rich surface texture, which is typically not available for most end-effectors, like a drill bit. Another problem in feature-based segmentation is the separation of features belonging to the objects from features belonging to the background. Binocular disparity and consistency optical flow may be included to allow separation of the object from the background. However, the disparity is not suitable when the difference in depth between an object and its background are small. Further, existing optical flow-based object segmentation methods often result in noisy and inconsistent flow patterns, especially if motion of the object is big. Moreover, they require oscillation-like movement of the tool (see Literature Reference No. 9), which is undesirable for a tool like a drill.

As another prior art example, active contours or so-called snakes are able to segment rigid and semi-rigid objects and are better able to preserve the shape of object (see Literature Reference No. 10). Such snakes allow tracking of arbitrary shapes and are relatively robust to occlusions. However, Snakes are sensitive to parameters and the initialization of the algorithm. Moreover, Snakes have a limited capture range and fail to detect concavities.

The performance of visual servoing highly depends on the robustness of the end-effector location. In a cluttered environment, the visual appearance of an end-effector depends upon a variety of parameters including geometry, surface characteristics, illumination, the geometric relation between camera and object(s), etc. The large number of parameters often results in a noisy and inconsistent appearance of the end-effector, obscuring its extraction. Therefore, almost all of the existing techniques are either model-based and require an off-line calibration or require special markers/fiducial points on an end-effector. Moreover, the lighting and environment are usually contrived (for instance using white backgrounds and dark objects) to yield a high contrast and thereby naturally distinguish foreground objects from the background. Vision under natural conditions remains very challenging.

Thus, a continuing need exists for a device and system that can robustly locate a drill bit or other tool tip in a variety of conditions.

SUMMARY OF INVENTION

Described is a system, method, and computer program product for localizing and controlling a tool tip with a robotic arm. The system, for example, includes one or more processors and a memory. The memory is a non-transitory computer-readable medium having executable instructions encoded thereon, such that upon execution of the instructions, the one or more processors performs several operations, such as receiving three-dimensional (3D) visual information of a scene having a tool with a tool tip proximate a target; generating a depth disparity map based on the 3D visual information; filtering the depth disparity map by depth continuity to generate loose boundaries of the tool; shrinking and extracting the boundaries of the tool as an extracted tool boundary; identifying ends of the tool tip based on the extracted tool boundary; and generating a pose of the tool tip.

In another aspect, the 3D visual information is a pair of stereo images generated from a stereo camera.

In yet another aspect, in shrinking and extracting the boundaries of the tool, the tool boundary is shrunk using level set segmentation.

Further, the extracted tool boundary has varying width and wherein generating a pose of the tool tip further includes operations of designating a tool tip end closest to the target as a distal tool tip end; identifying a tool tip axis as a line passing through the distal tool tip end and whose length is longest inside the extracted tool boundary; and identifying the orientation in 3D of the tool tip based on combining tool tip axes from at least two stereo images.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
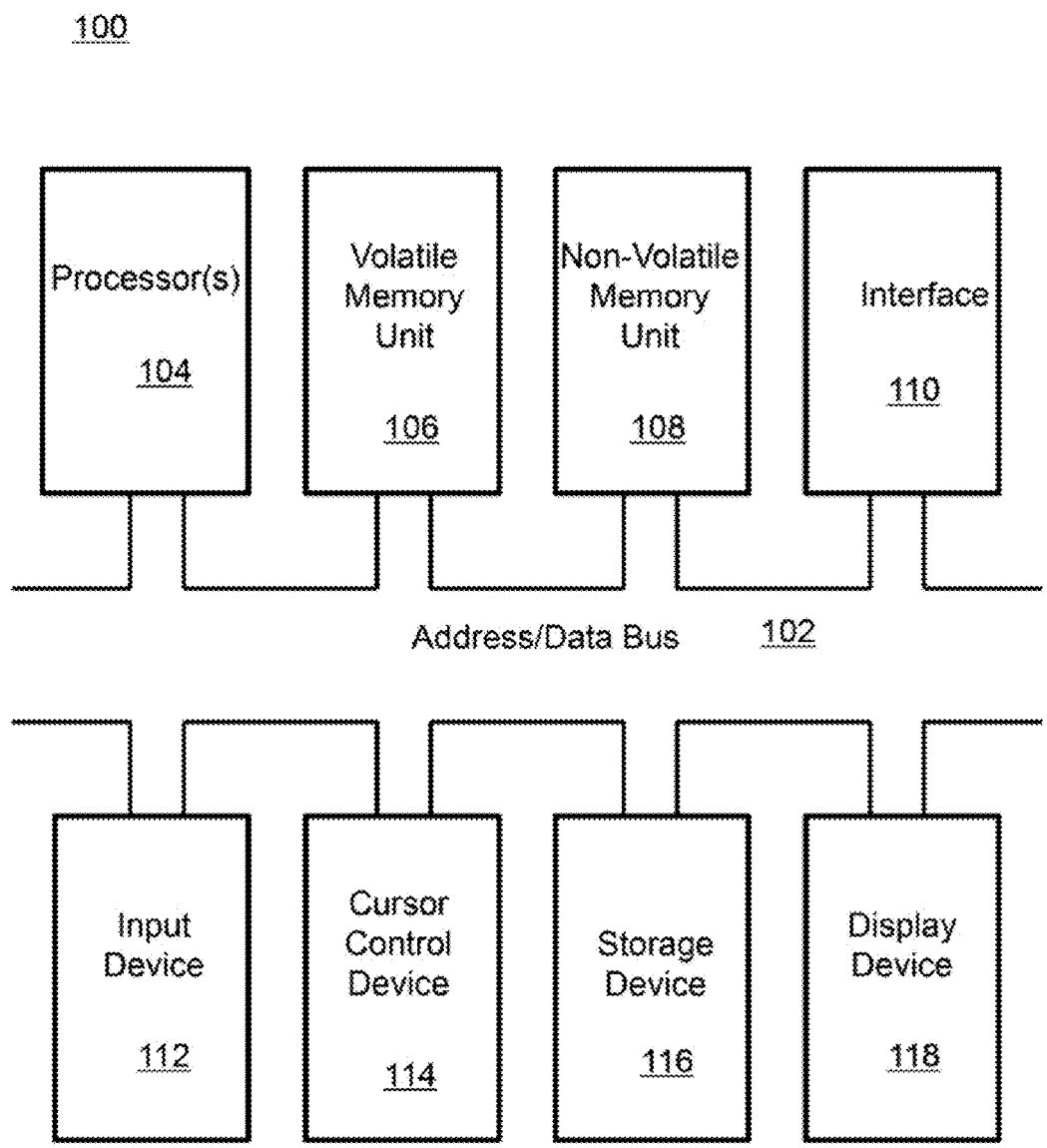
FIG. 1 is a block diagram depicting the components of a system according to the principles of the present invention.

The present invention relates to robotic control systems and, more particularly, to a device and method to control a tool tip with a robot arm. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "stop of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. T. F. Chan and L. A. Vese. Active contours without edges. *IEEE Transactions on Image Processing*, 10(2): 266-277, February 2001.
2. Science. 2010 Jul. 30;329(5991):508-9. Making smarter, savvier robots. Kean S.
3. The Gulf Spill's Lessons for Robotics. Ariel Bleicher. IEEE Spectrum News. August 2010.
4. K. Kragic and H. I. Christensen. Integration of visual cues for active tracking of an end-effector, Proceedings of the *IEEE/RSJ International Conference on Intelligent Robots and Systems*, 1999.
5. C. Harris and M. Stephens. A combined corner and edge detector, *Proceedings of the 4th Alvey Vision Conference*, 1988.
6. C. Tomasi and T. Kanade. Detection and Tracking of Point Features, *Carnegie Mellon University Technical Report CMU-CS*-91-132, 1991.
7. D. Lowe. Distinctive Image Features from Scale-Invariant Keypoints, *International Journal of Computer Vision*, 60 (2): 91, 2004.
8. F. Hoffmann, T. Nierobisch, T. Seyffarth and G. Rudolph. Visual servoing with moments of SIFT features, *IEEE International Conference on Systems, Man, and Cybernetics*, 2006.
9. C. C. Kemp and A. Edsinge. Robot manipulation of human tools: Autonomous detection and control of task relevant features. 5*th IEEE International Conference on Development and Learning*, 2006.
10. T. Drummond and R. Cipolla. Real-time tracking of complex structures with on-line camera calibration, *Proceedings of the British Machine Vision Conference, BMVC*, Vol. 2, Nottingham, pp. 574-583, 1999.
11. P. Chockalingam, N. Pradeep and S. Birchfield. Adaptive fragments-based tracking of non-rigid objects using level Sets, *Proceedings of the IEEE Conference on International Conference on Computer Vision (ICCV)*, Kyoto, Japan, September 2009.

(2) Principal Aspects

The present invention has three "principal" aspects. The first is a robot-arm control system. The system is typically in the form of a computer system operating software or in the form of a "hard-coded" instruction set. This system may be incorporated into a wide variety of devices that provide different functionalities, including the robot arm and desired robot hardware (e.g., sensors, motors, tools, etc.). The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
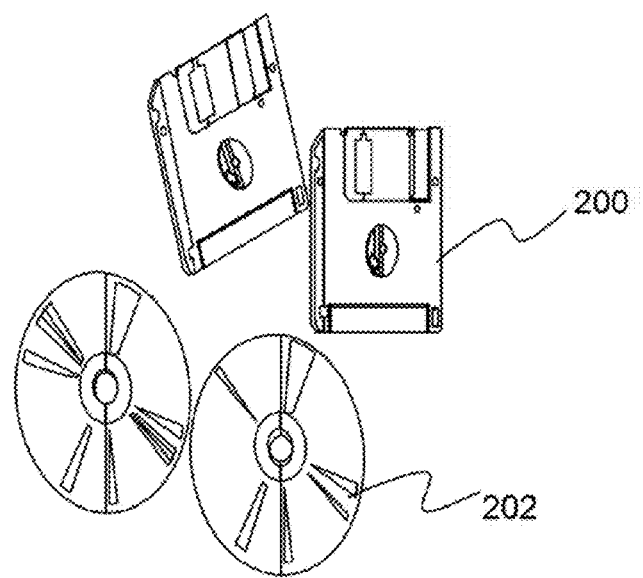
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Described is a system that can robustly locate a drill bit or other elongated tool tip. In one aspect, the system combines two-dimensional (2D) contour data and three-dimensional (3D) spatial information to robustly locate a tool tip. The 3D spatial information of the tool is obtained from a sensor (e.g., stereo camera) and is used to initialize the boundary of the foreground. Then, this boundary is shrunk to the shape of the drill bit to preserve the accurate boundaries of the drill. The boundary is shrunk using any suitable boundary shrinkage technique, a non-limiting example of which includes a method known as level sets (see Literature Reference No. 1). The extracted drill boundaries are then used to locate the end of the drill bit.

The location of a tool tip can be used for visual servoing, which is of great interest to any system that requires robotic tool manipulation. For example, the system can be utilized in human-robot cooperation for manufacturing. Such cooperation requires tool use in less structured and uncertain environments, which the invention addresses.

(4) Specific Details of the Invention

Figure 3:
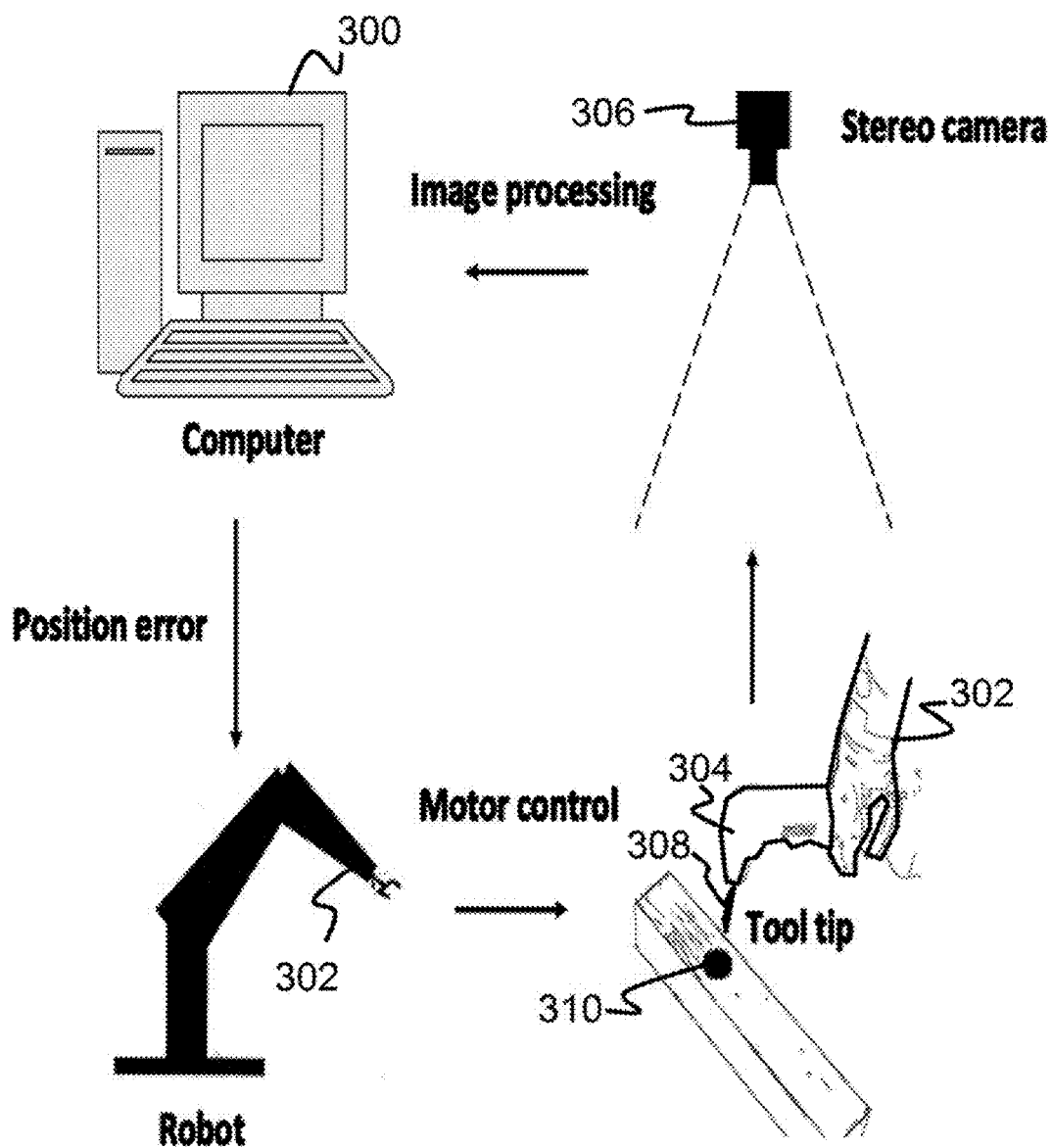
FIG. 3 is an illustration depicting various components according to the principles of the present invention.

FIG. 3 provides an overview of various system components according to the principles of the present invention. Specifically, FIG. 3 illustrates a computer 300, a robotic arm 302 with a tool 304, and a visual sensor 306 (a non-limiting example of which includes a stereo camera). The task of the robot is to move the tool tip 308 to a target 310 or along a given trajectory. The visual sensor 306 records the tool tip 308. Given this visual input, the image processing method extracts the tool tip 308 position. Then, the computer 300 uses this position to control the robot arm 302. For example, the robot arm 302 is controlled to reduce the visually observed difference between the tool tip 308 and a given target 310.

A unique aspect is in the image processing, which uses 3D depth information to segment the tool 304 from the background and a level-set based contour segmentation (e.g., using the level-set technique described in Literature Reference No. 1) to preserve the accurate boundaries of the tool tip 308.

Figure 4:
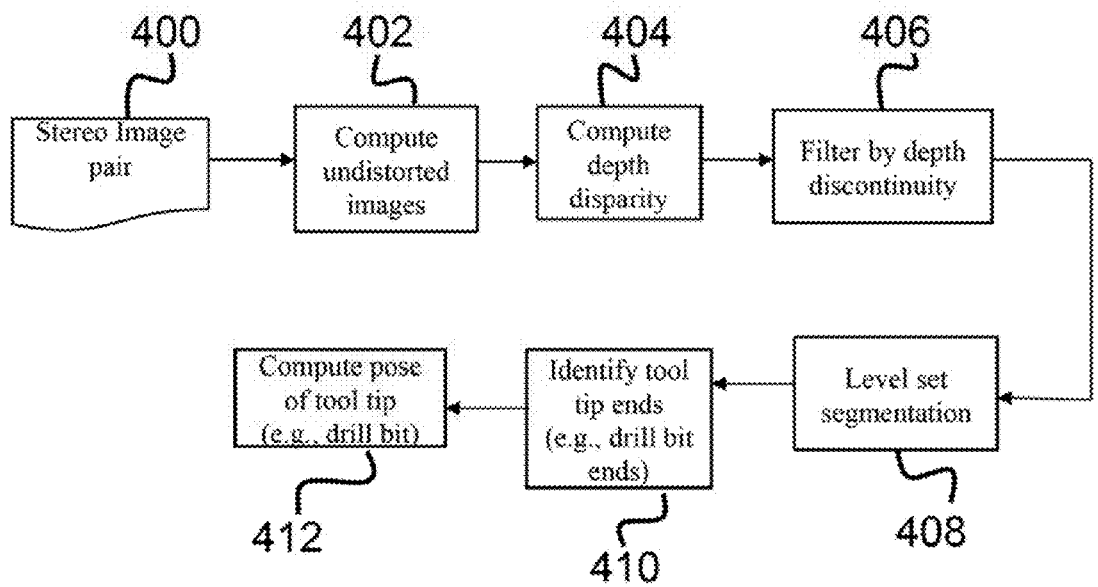
FIG. 4 is a block diagram illustrating a process for localizing and controlling a tool tip with a robot arm according to the principles of the present invention.

For further understanding, FIG. 4 provides a block diagram of the process according to the principles of the present invention. The system first receives a pair of stereo images 400 (from the stereo camera) or equivalent 3D visual information and computes undistorted images 402. The undistorted images 402 are computed by using a transform function, e.g., as provided by the OpenCV library (opencv.org), to compensate for lens distortion.

Thereafter, the system computes the depth disparity 404 by generating a depth map. The resulting scene is then filtered by depth continuity 406. In other words, the scene is segmented such that image parts of continuously varying depth are grouped together; that is, the discontinuity in depth defines the segmentation boundaries. Because of noise, such segmentation may miss parts of the tool that the system is attempting to extract. Therefore, a segmentation threshold is chosen such that the tool tip is fully contained even at the expense of having a loose boundary, i.e., it reaches beyond the tool boundary and includes background image regions.

Since this segmentation boundary is too wide for accurate tool-tip detection, it is shrunk again in the 2D visual scene using level set segmentation 408 (i.e., via the level-set algorithm). In doing so, accurate boundaries of the tool are extracted, which then allows the system to search for (identify) tool tip ends 410. The system searches for tool-tip ends 410 as described below. This search also provides the axis of the tool tip within the 2D image. Finally, given the boundary and tool-tip ends, the system can compute a pose of the tool tip 412. The system computes a pose of the tool tip 412 by finding tool-tip ends and axes in both stereo images and converting each pair of 2D positions into one 3D position.

Figure 5:
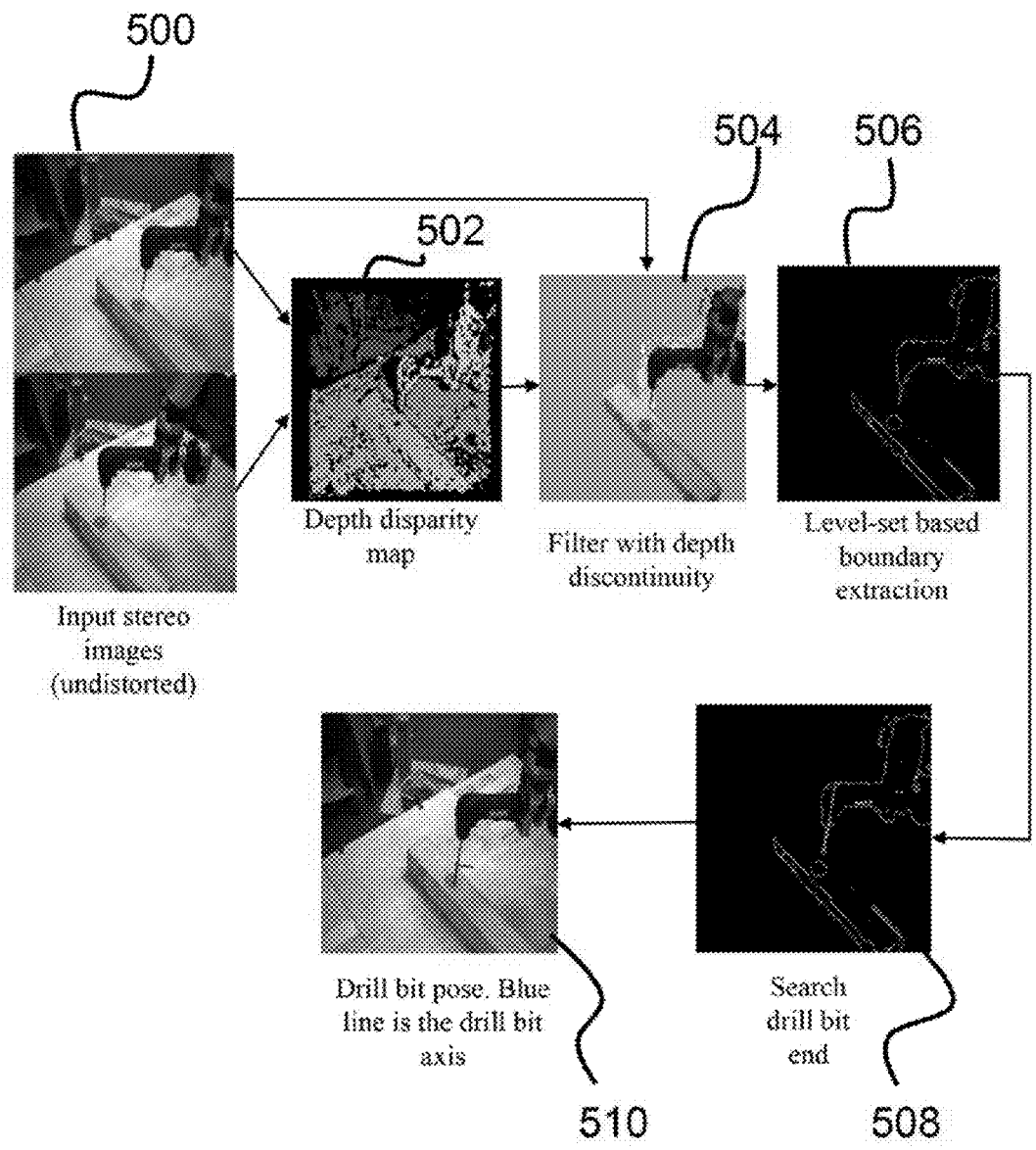
FIG. 5 is a block diagram illustrating a process for localizing and controlling a tool tip with a robot arm according to the principles of the present invention.

The invention was tested in detecting a drill bit. FIG. 5, for example, shows the processing steps from a single test. Images 500 from the stereovision sensor were undistorted and a depth disparity map 502 was computed. Then, the drill and drill block were segmented 504 from background based on depth. A level set based algorithm was used to extract 506 accurate boundaries of the drill, which can be used later to extract the tool tip end.

Provided below is an example of the level set algorithm as used for tool tip detection to extract boundaries of the tool. To accurately represent a generic contour, it is desirable to use the formulation of level sets due to their numerical stability. Let $\Gamma(s)=[x(s)y(s)]^T$, $s \in [0, 1]$, be a closed curve in $\mathbb{R}^2$, and define an implicit function $\Phi(x,y)$ such that the zero level set of $\Phi$ is $\Gamma$, i.e., $\Phi(x,y)=0$ if and only if $\Gamma(s)=[x,y]^T$ for some $s \in [0, 1]$. Let $R^-$ be the region inside the curve (where $\Phi>0$) and $R^+$ the region outside the curve (where $\Phi>0$). To extract the boundary of the object, the goal is to minimize the energy functional as below, which is an Euler-Lagrange equation, $$E(c_i,c_o,\Gamma)=\mu \cdot \text{Length}(\Gamma)+v \cdot \text{Area}(\omega)+\lambda_i E_i(c_i,\Gamma)+\lambda_o E_o(c_o,\Gamma),$$

where, $\mu$, $v$ $\lambda_i$ $\lambda_o$ are constants; $\Gamma$ is contour; $\omega$ is interior region bounded by $\Gamma$; $c_i$ and $c_o$ are average intensities inside and outside $\Gamma$. The regularized Heaviside function $$H(z) = \frac{1}{1+e^{-z}}$$

is used as a differentiable threshold operator. With this function, the components in the Euler-Lagrange equation are computed as $$\text{Length}(\Gamma)=\int_\Omega |\nabla H(\Phi(x,y))| dx\, dy$$

$$\text{Area}(\Gamma)=\int_\Omega H(\Phi(x,y)) dx\, dy$$

$$E_i(c_i,\Gamma)=\int_\Omega |I(x,y)-c_i|^2 H(\Phi(x,y)) dx\, dy$$

$$E_o(c_o,\Gamma)=\int_\Omega |I(x,y)-c_o|^2 [1-H(\Phi(x,y))] dx\, dy$$

where I is the intensity of the gray image, and $\Omega$ is the image area.

The Euler-Lagrange equation can be minimized using gradient descent (an example of this minimization was described in Literature Reference No. 11), $$\Delta \phi = -|\nabla \phi| \left[ v + \lambda_i |I(x) - c_i|^2 - \lambda_o |I(x) - c_o|^2 - \mu \, div\left( \frac{\nabla \phi(x)}{|\nabla \phi(x)|} \right) \right]$$

Figure 6:
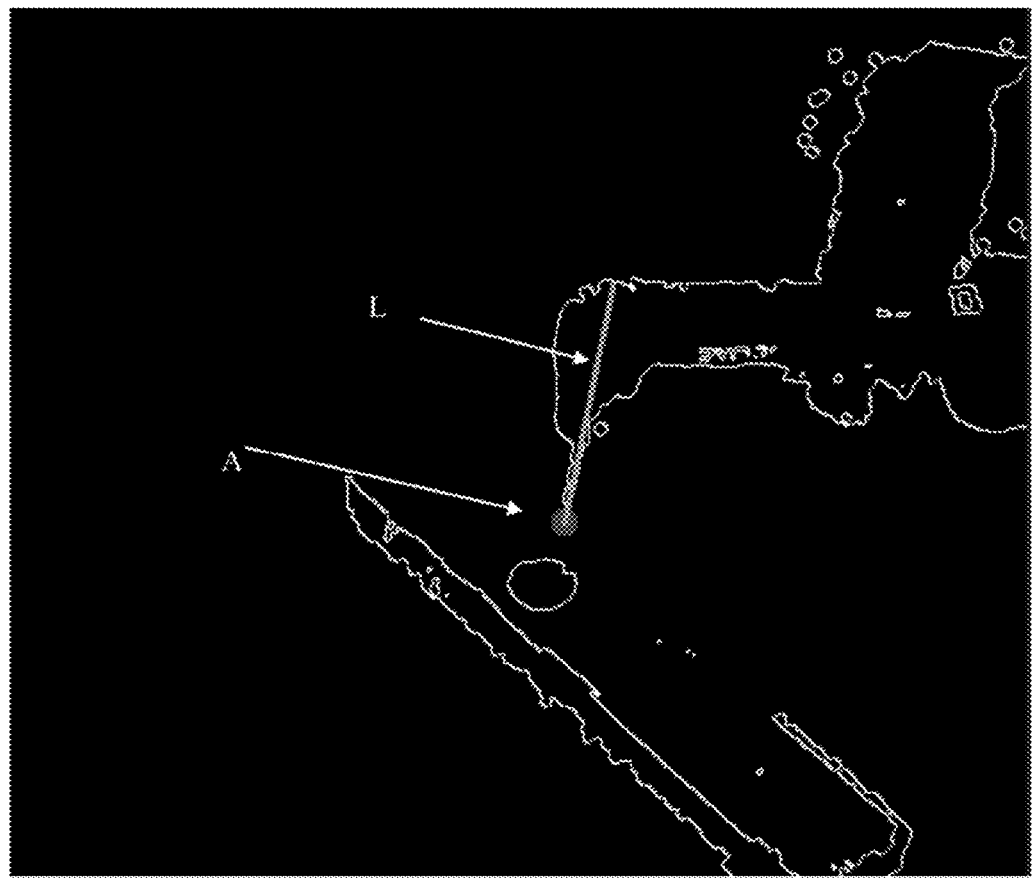
FIG. 6 is an illustration depicting localization of drill bit end points.

The complete level set algorithm is summarized as below:
1. Initialize $\Gamma$ and $\Phi$
2. Use $\Phi$ to compute $c_i$ and $c_o$
3. Iterate
   i. Update $\Phi$ using one gradient descent steps according to the above equation
   ii. Compute $\Gamma$ from $\Phi$
   III. Reinitialize $\Phi$
   iv. Use $\Phi$ to compute $c_i$ and $c_o$
Until convergence After the boundaries of the drill are extracted, a heuristic scheme is employed to find the tool-tip (drill bit) end (508) and the line that corresponds to the drill bit. A non-limiting example of a heuristic scheme is as follows. Since the system is in the pre-drilling phase, the tip of drill bit (depicted as point A in FIG. 6) is the closest point to the drilling target in the scene. Thus, the drill bit axis (i.e., Line L) is identified as the line that passes through point A and whose length is the longest inside the drill boundary.

From this line and corresponding 3D information, the position and orientation of the drill bit are extracted (i.e., referring to FIG. 5, a drill bit pose 510 is determined). Point A and line L are computed in both stereo images. Their locations in these images are sufficient to compute the position and orientation of the drill bit in 3D by reversing the geometric projections.

Finally, the system according to the principles of the present invention allows for tool tip localization and control based on 3D sensor information combined with depth analysis and segmentation.

What is claimed is:

1. A system for localizing and controlling a tool tip with a robotic arm, the system comprising:
   one or more processors and a memory, the memory being a non-transitory computer-readable medium having executable instructions encoded thereon, such that upon execution of the instructions, the one or more processors perform operations of:
   receiving three-dimensional (3D) visual information of a scene having a tool with a tool tip proximate a target;
   generating a depth disparity map based on the 3D visual information;
   filtering the depth disparity map by depth continuity to generate loose boundaries of the tool;
   shrinking and extracting the boundaries of the tool as an extracted tool boundary;
   identifying ends of the tool tip based on the extracted tool boundary; and
   generating a pose of the tool tip.

2. The system as set forth in claim 1, wherein the 3D visual information is a pair of stereo images generated from a stereo camera.

3. The system as set forth in claim 2, wherein in shrinking and extracting the boundaries of the tool, the tool boundary is shrunk using level set segmentation.

4. The system as set forth in claim 3, wherein the extracted tool boundary has varying width and wherein generating a pose of the tool tip further includes operations of:
   designating a tool tip end closest to the target as a distal tool tip end;
   identifying a tool tip axis as a line passing through the distal tool tip end and whose length is longest inside the extracted tool boundary; and
   identifying the orientation in 3D of the tool tip based on combining tool tip axes from at least two stereo images.

5. The system as set forth in claim 1, wherein in shrinking and extracting the boundaries of the tool, the tool boundary is shrunk using level set segmentation.

6. The system as set forth in claim 1, wherein the extracted tool boundary has varying width and wherein generating a pose of the tool tip further includes operations of:
   designating a tool tip end closest to the target as a distal tool tip end;
   identifying a tool tip axis as a line passing through the distal tool tip end and whose length is longest inside the extracted tool boundary; and
   identifying the orientation in 3D of the tool tip based on combining tool tip axes from at least two stereo images.

7. A computer implemented method for localizing and controlling a tool tip with a robotic arm, the method comprising an act of:
   causing one or more processors to execute instructions encoded on a non-transitory computer-readable medium, such that upon execution, the one or more processors perform operations of:
   receiving three-dimensional (3D) visual information of a scene having a tool with a tool tip proximate a target;
   generating a depth disparity map based on the 3D visual information;
   filtering the depth disparity map by depth continuity to generate loose boundaries of the tool;
   shrinking and extracting the boundaries of the tool as an extracted tool boundary;
   identifying ends of the tool tip based on the extracted tool boundary; and
   generating a pose of the tool tip.

8. The method as set forth in claim 7, wherein the 3D visual information is a pair of stereo images generated from a stereo camera.

9. The method as set forth in claim 8, wherein in shrinking and extracting the boundaries of the tool, the tool boundary is shrunk using level set segmentation.

10. The method as set forth in claim 9, wherein the extracted tool boundary has varying width and wherein generating a pose of the tool tip further includes operations of:
    designating a tool tip end closest to the target as a distal tool tip end;
    identifying a tool tip axis as a line passing through the distal tool tip end and whose length is longest inside the extracted tool boundary; and
    identifying the orientation in 3D of the tool tip based on combining tool tip axes from at least two stereo images.

11. The method as set forth in claim 7, wherein in shrinking and extracting the boundaries of the tool, the tool boundary is shrunk using level set segmentation.

12. The method as set forth in claim 7, wherein the extracted tool boundary has varying width and wherein generating a pose of the tool tip further includes operations of:
    designating a tool tip end closest to the target as a distal tool tip end;
    identifying a tool tip axis as a line passing through the distal tool tip end and whose length is longest inside the extracted tool boundary; and
    identifying the orientation in 3D of the tool tip based on combining tool tip axes from at least two stereo images.

13. A computer program product for localizing and controlling a tool tip with a robotic arm, the computer program product comprising computer-readable instructions stored on a non-transitory computer-readable medium that are executable by a computer having one or more processors, such that upon execution of the instructions, the one or more processors perform operations of:
    receiving three-dimensional (3D) visual information of a scene having a tool with a tool tip proximate a target;
    generating a depth disparity map based on the 3D visual information;
    filtering the depth disparity map by depth continuity to generate loose boundaries of the tool;
    shrinking and extracting the boundaries of the tool as an extracted tool boundary;
    identifying ends of the tool tip based on the extracted tool boundary; and
    generating a pose of the tool tip.

14. The computer program product as set forth in claim 13, wherein the 3D visual information is a pair of stereo images generated from a stereo camera.

15. The computer program product as set forth in claim 14, wherein in shrinking and extracting the boundaries of the tool, the tool boundary is shrunk using level set segmentation.

16. The computer program product as set forth in claim 15, wherein the extracted tool boundary has varying width and wherein generating a pose of the tool tip further includes operations of:
    designating a tool tip end closest to the target as a distal tool tip end;
    identifying a tool tip axis as a line passing through the distal tool tip end and whose length is longest inside the extracted tool boundary; and identifying the orientation in 3D of the tool tip based on combining tool tip axes from at least two stereo images.

17. The computer program product as set forth in claim 13, wherein in shrinking and extracting the boundaries of the tool, the tool boundary is shrunk using level set segmentation.

18. The computer program product as set forth in claim 13, wherein the extracted tool boundary has varying width and wherein generating a pose of the tool tip further includes operations of:
- designating a tool tip end closest to the target as a distal tool tip end;
- identifying a tool tip axis as a line passing through the distal tool tip end and whose length is longest inside the extracted tool boundary; and
- identifying the orientation in 3D of the tool tip based on combining tool tip axes from at least two stereo images.

* * * * *